J. C. TALLMAN,

Assignor to L. C. WARNER.

Manufacture of Corsets.

No. 9,137. Reissued Mar. 30, 1880.

Attest:
Courtney A. Cooper
William Paxton

Inventor:
John C. Tallman
By his attorney
Charles E. Foster

N. PETERS, PHOTO-LITHOGRAPHER, WASHINGTON, D. C.

UNITED STATES PATENT OFFICE.

JOHN C. TALLMAN, OF NEW YORK, N. Y., ASSIGNOR TO LUCIEN C. WARNER.

MANUFACTURE OF CORSETS.

SPECIFICATION forming part of Reissued Letters Patent No. 9,137, dated March 30, 1880.

Original No. 200,583, dated February 19, 1878. Application for reissue filed January 31, 1879.

*To all whom it may concern:*

Be it known that I, JOHN C. TALLMAN, of the city, county, and State of New York, have invented an Improvement in the Manufacture of Corsets and Bosom-Pads, of which the following is a specification.

The object of my invention is to construct a bosom-pad or a corset, in whole or in part, in such a manner as to compress the seams and produce a shapely finely-finished article, and without necessarily employing stiffening bones or ribs.

The further object of my invention is an apparatus for carrying out the first feature of the improvement.

Figure 1:
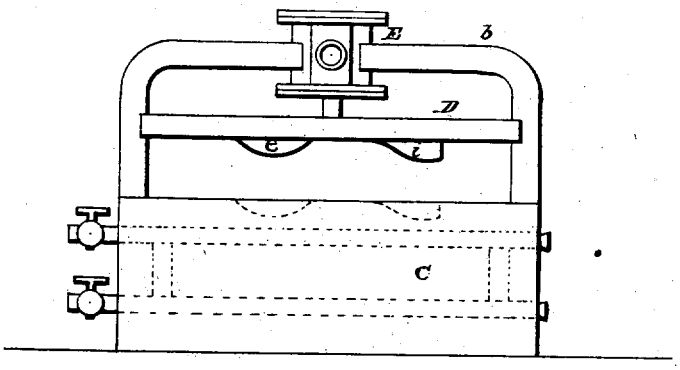
Figure 2:
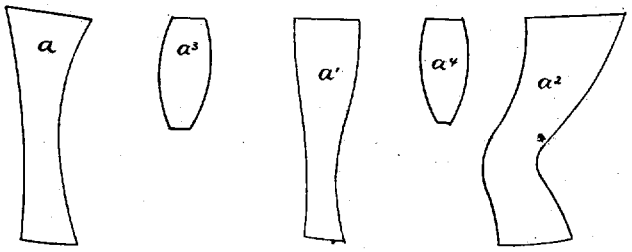
Figure 3:
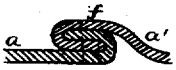
Figure 4:
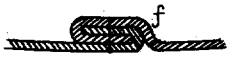
Figure 5:
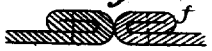

In the accompanying drawings, Figure 1 is a side elevation of apparatus used in making corsets or bosom-pads; Fig. 2, a view showing the sections of a corset; Fig. 3, an enlarged section, showing the formation of the seams after the pieces are stitched together; Fig. 4, the same, showing the seam after the corset is completed, and Figs. 5 and 6 modifications.

In corsets heretofore made the requisite stiffness has been obtained by means of bones, which are apt to break or wear through the material, or by saturating the corset with some stiffening material, as starch, mastic, &c., which soon becomes broken or soft.

I discard, if necessary, both these modes, and secure the requisite stiffness by utilizing the corset material itself in the manner which I will now describe.

In Fig. 2 the pieces represented are those which form the front half-section of a corset. It should be understood, however, that the shapes of these pieces have nothing to do with my invention, which is applicable to corsets of any required make.

Figure 6:
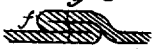

The pieces $a$ $a'$ $a^2$, with the gores $a^3$ $a^4$, are shown of the form required for a bosom-pad corset, and are preferably made of some stiff material and fabric—as, for instance, haircloth and linen. The particular materials used, however, constitute no part of my invention. In carrying out this feature of the invention each piece is sewed to the other in such a manner as to form when folded a heavy seam—as, for instance, in the manner shown in Fig. 3, or in the modification, Fig. 5, such seams being made whenever two parts are sewed together, or, if necessary, by folding or plaiting the fabric upon itself, as shown in Fig. 6.

After being thus prepared the connected pieces are subjected to the action of a powerful press, Fig. 1, consisting of the female die C, the male die D, and the pressure device E, the latter, in the present instance, being a hydraulic press carried by a yoke, $b$, attached to the lower die, C. The faces of the die conform to the form of the corset or part of the corset to be made, the full corset-die having the bosom-pad portion $e$ and the hip portion $i$.

The lower die, C, is heated by steam passed through channels formed in the body of the die by boring through the same, as shown in dotted lines, the ends of the openings being plugged up and communication formed by boring through adjacent openings.

The powerful pressure exerted by the dies combined with the action of the heat serves to mold and set the corset to the required shape, so as to produce a shapely and finely-finished article. The main effect, however, is to condense and solidify the ribs or plaits formed by folding the material, so that when the article is removed from the press the condensed and hardened ribs will form rigid ridges, extending through the corset and imparting the rigidity usually obtained by bones without the disadvantages of the latter. It will be obvious that a like effect will result from pressing ordinary seams.

In some instances it may be best to insure a permanent set by coating the body of the material, or the folded portion alone, with a suitable stiffening or cement.

It will be apparent that detachable busts, pads, or other separate portions of the corset may be made and stiffened in the same manner as the body.

I claim—

1. The mode within described of manufacturing corsets and bosom-pads—that is, by uniting the various pieces forming seams, and then condensing the latter and molding the body by subjecting the same to heat and pressure between dies, substantially as set forth.

2. The within-described mode of manufacturing corsets and bosom-pads of stiff material, consisting in uniting the various sections forming seams, and then condensing and stiffening the same under heat and pressure by dies, whereby the body of the article is also molded and set in shape, as set forth.

3. A corset-pad, or part of a corset, having ribs formed of folds of the body material, compressed in the manner and by the means substantially as specified.

4. The corset-press consisting of the lower die, C, and heating devices, upper die, D, and pressing device E, supported by a yoke, *b*, connected to the die C, as described.

In testimony whereof I have signed my name to this specification in the presence of two subscribing witnesses.

JOHN C. TALLMAN.

Witnesses:

G. A. STAPLES,

P. M. CARY.